United States Patent [19]

Okada et al.

[11] Patent Number: 4,681,404
[45] Date of Patent: Jul. 21, 1987

[54] LIQUID CRYSTAL DEVICE AND DRIVING METHOD THEREFOR

[75] Inventors: Shinjiro Okada, Kawasaki; Junichiro Kanbe, Yokohama, both of Japan

[73] Assignee: Canon Kabushiki Kaisha, Tokyo, Japan

[21] Appl. No.: 779,651

[22] Filed: Sep. 24, 1985

[30] Foreign Application Priority Data

Oct. 4, 1984 [JP] Japan .................... 59-209255

[51] Int. Cl.$^4$ ............................................. G02F 1/133
[52] U.S. Cl. ................... 350/350 S; 350/351; 350/342; 350/336; 340/784; 427/160; 427/166
[58] Field of Search .............. 350/350 S, 342; 340/784; 427/166

[56] References Cited

U.S. PATENT DOCUMENTS

| 3,861,135 | 1/1975 | Seeger, Jr. et al. | 350/331 R |
| 4,538,884 | 9/1985 | Masaki | 350/342 |
| 4,595,260 | 6/1986 | Kubota | 350/351 |

*Primary Examiner*—John K. Corbin
*Assistant Examiner*—Martin Lerner
*Attorney, Agent, or Firm*—Fitzpatrick, Cella, Harper & Scinto

[57] ABSTRACT

A liquid crystal device for time-division driving comprising a plurality of picture elements arranged in a plurality of rows. Each picture element is composed of opposite electrodes, a layer of a ferroelectric liquid crystal having a volume resistivity of $1 \times 10^9$ Ω.cm or larger, disposed between the opposite electrodes and placed under bistability condition, and an insulating layer disposed on at least one of the opposite electrodes. The liquid crystal device is adapted to driving according to a time-division driving scheme wherein a writing signal is applied row by row and cyclically to the picture elements, and a particular row of picture elements to which the writing signal has been applied in a writing cycle retain their written states until a writing signal is applied to the particular row in a subsequent writing cycle.

31 Claims, 16 Drawing Figures

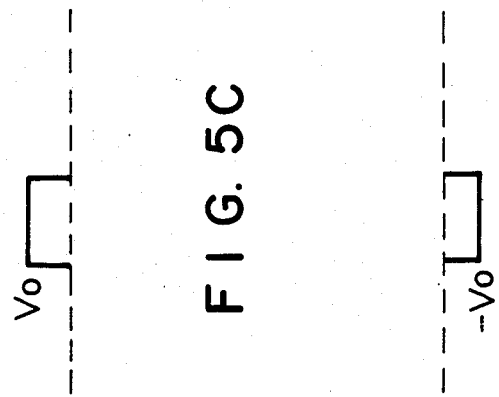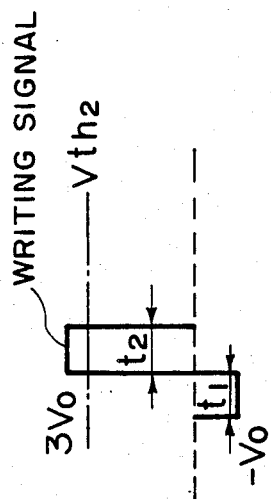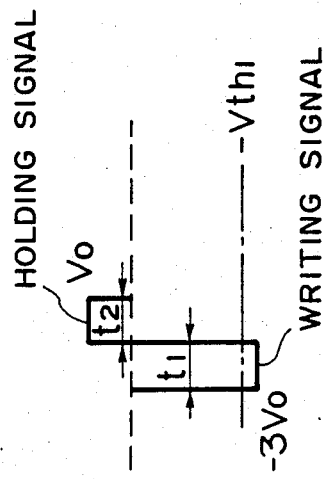

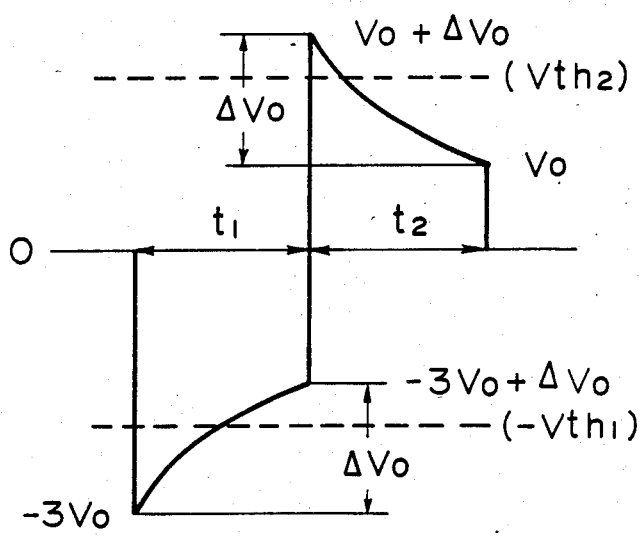
F I G. 6

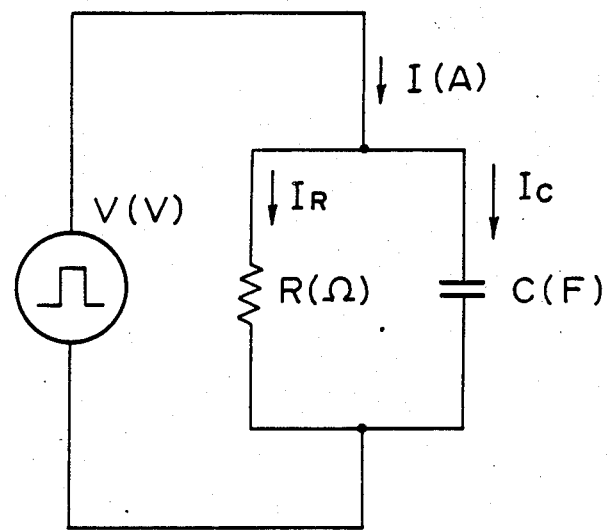
F I G. 10

LIQUID CRYSTAL DEVICE AND DRIVING METHOD THEREFOR

FIELD OF THE INVENTION AND RELATED ART

The present invention relates to a liquid crystal device using a liquid crystal having bistability with respect to an electric field (hereinafter referred to as "bistable liquid crystal"), especially a ferroelectric liquid crystal, and more particularly to a liquid crystal device for time-division driving of the memory driving type.

Liquid crystal display devices for displaying a pattern or information have been well known in which a plurality of scanning electrodes and a plurality of signal electrodes are arranged in the form of a matrix and liquid crystals are interposed between the scanning and signal electrodes, whereby a plurality of picture elements are defined. In order to drive such liquid crystal display devices, a time-division driving method is used in which an address signal is applied sequentially and periodically to the scanning electrodes and in synchronism with the address signal predetermined information signals are selectively applied to the signal electrodes in parallel. Such liquid crystal display devices and the methods for driving them have serious defects as will be described below.

Thus, it is difficult to increase the density of picture elements or the size of a picture. Liquid crystals which have been used in practice in liquid crystal display device because of their fast response and their low electric power consumption are twisted nematic liquid crystals of the kind disclosed in, for instance, "Voltage Dependent Optical Activity of a Twisted Nematic Liquid Crystals", M. Schadt and W. Helfrich in Applied Physics Letters, Vol. 18, No. 4, (Feb. 15, 1971), pages 127–128. The liquid crystals of this kind assume a helical structure in which the molecules of a nematic liquid crystal having a positive dielectric anisotropy are twisted in the direction of the thickness of the liquid crystal layer and are arranged in parallel with each other between electrodes when it is not applied with an electric field. When an electric field is applied, the molecules of the nematic liquid crystal with a positive dielectric anisotropy are oriented or aligned in the direction of the electric field to cause optical modulation. In the case of a display device in which a liquid crystal of the kind described is used and which has a matrix of electrodes, a voltage higher than a threshold voltage required for arranging the molecules of the liquid crystal in the direction perpendicular to the surfaces of the electrodes is applied to a region (selected point) at which both a scanning electrode and a signal electrode are selected and no voltage is applied to a region (non-selected point) at which neither of a scanning electrode and a signal electrode is selected. As a result, the molecules of the liquid crystal are maintained in a stable state in which they are in parallel with the surfaces of the electrodes. When linear polarizers are disposed upon the upper and lower surfaces of a liquid crystal cell or device of the type described in cross nicol relationship, a selected point prevents the transmission of light while a non-selected point permits the transmission of light, whereby a display or picture device is formed. However, in the case of a liquid crystal device with a matrix of electrodes, a finite electric field is applied to a region (the so-called "semi-selected or half-selected point") in which a scanning electrode is selected while a signal electrode is not selected or in which a scanning electrode is not selected while a signal electrode is selected. When the difference between a voltage applied to a selected point and a voltage applied to a half-selected point is sufficiently large and if a threshold voltage at which the molecules of a liquid crystal are oriented in the direction perpendicular to a electric field applied is between the above described voltages, the correct operation of a display element can be ensured. However, when the number (N) of scanning lines is increased, a time period (duty ratio) during which one selected point is subjected to an effective electric field during the time when one frame is scanned is decreased at a ratio of 1/N. As a consequence, in the case of repetitive scanning, the greater the number of scanning lines, the smaller the effective voltage difference between a selected point and a non-selected point becomes. As a result, the problems of the reduction in contrast of a picture and of crosstalk are unavoidable. These essentially unavoidable problems result when a driving method (that is, a repetitive scanning method) in which a liquid crystal which is not bistable (that is, a liquid crystal in which the molecules assume a stable state in which they are oriented in the horizontal direction relative to the surfaces of the electrodes and are oriented in the vertical direction only when an effective electric field is applied) is driven by utilizing a time storage effect. In order to overcome these problems, there have been proposed a voltage averaging method, a two-frequency driving, a multiple matrix method and so on. However, none of these is satisfactory in solving the above described problems. Therefore, it is impossible at present to provide a display device with a large picture size and with a high density of picture elements because it is impossible to sufficiently increase the number of scanning lines.

SUMMARY OF THE INVENTION

An object of the present invention is to provide a novel liquid crystal device for time-division driving which has solved the problems involved in the conventional liquid crystal devices.

The liquid crystal device for time-division driving according to the present invention has been developed to accomplish the above object and more specifically comprises a liquid crystal device for time-division driving comprising a plurality of picture elements arranged in a plurality of rows; each picture element comprising opposite electrodes, a layer of a ferroelectric liquid crystal disposed between the opposite electrodes and placed under bistability condition, and an insulating layer disposed on at least one of the opposite electrodes, the liquid crystal device being adapted to driving according to a time-division driving scheme wherein a writing signal is applied row by row and cyclically to the picture elements, and a particular row of picture elements to which the writing signal has been applied in a writing cycle retain their written states until a writing signal is applied to the particular row in a subsequent writing cycle, the ferroelectric liquid crystal having a volume resistivity of $1 \times 10^9$ $\Omega$.cm or larger.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIGS. 5A to 5D illustrate voltage waveforms applied between matrix electrodes, FIG. 6 shows a writing voltage waveform effectively applied to a liquid crystal layer at a picture element B, FIG. 10 shows a diagram of a circuit used for the volume resistivity of a liquid crystal.

DESCRIPTION OF THE PREFERRED EMBODIMENTS

As the liquid crystal used in the liquid crystal device according to the present invention, a liquid crystal material placed under a condition of assuming either a first optically stable state or a second optically stable state depending upon an electric field applied thereto, i.e., a bistable liquid crystal, is used.

As such bistable liquid crystals, chiral smectic liquid crystals having ferroelectricity are most preferred. Among them, liquid crystals in chiral smectic C phase (SmC*), H phase (SmH*), I phase (SmI*), J phase (SmJ*), K phase (SmK*), G phase (SmG*) or F phase (SmF*) are suited. These ferroelectric liquid crystals are described in, e.g., "LE JOURNAL DE PHYSIQUE LETTERS" 36 (L-69), 1975 "Ferroelectric Liquid Crystals": "Applied Physics Letters" 36 (11) 1980, "Submicro Second Bistable Electrooptic Switching in Liquid Crystals", "Solid State Physics" 16 (141), 1981 "Liquid Crystal", etc. Ferroelectric liquid crystals disclosed in these publications may be used in the present invention.

Specific examples of the ferroelectric liquid crystal compounds to be used in the present invention include those represented by the following formulas

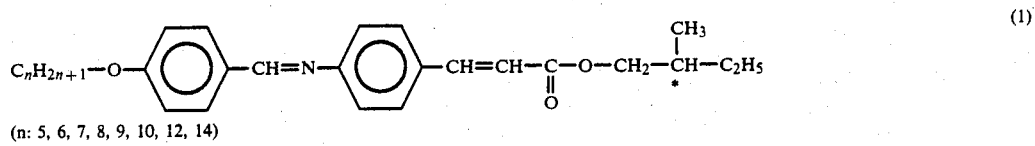

(n: 5, 6, 7, 8, 9, 10, 12, 14)

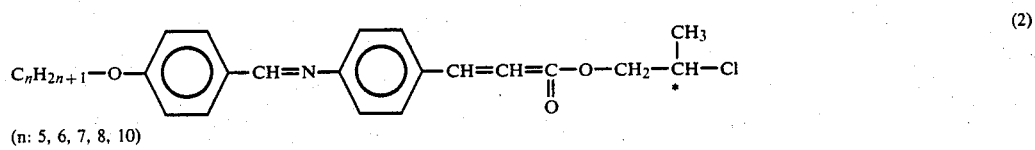

(n: 5, 6, 7, 8, 10)

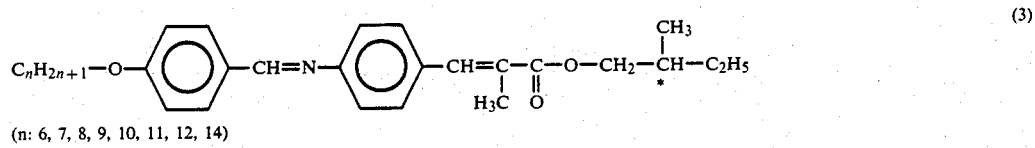

(n: 6, 7, 8, 9, 10, 11, 12, 14)

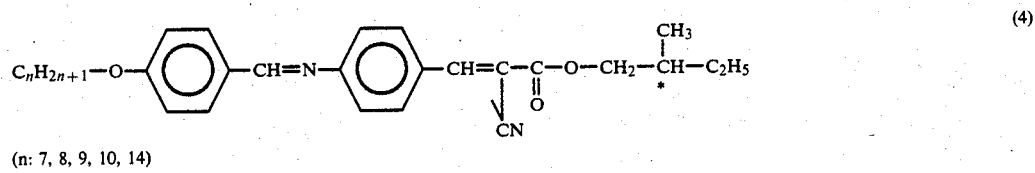

(n: 7, 8, 9, 10, 14)

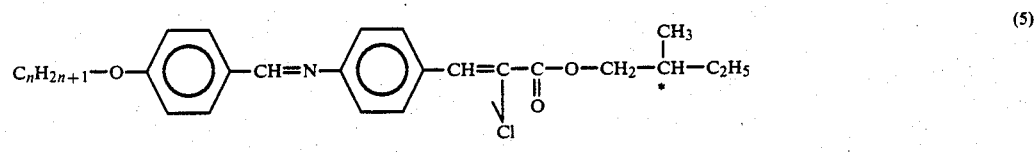

(n: 6, 8, 10, 14)

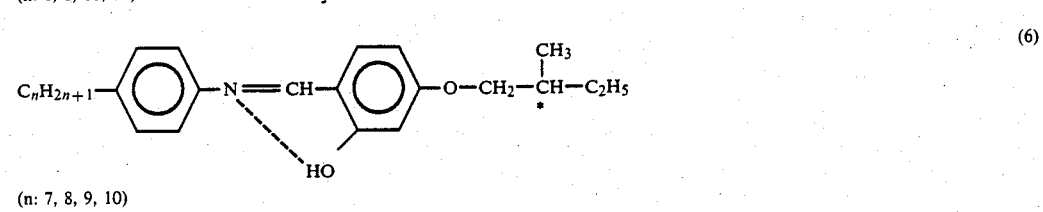

(n: 7, 8, 9, 10)

-continued

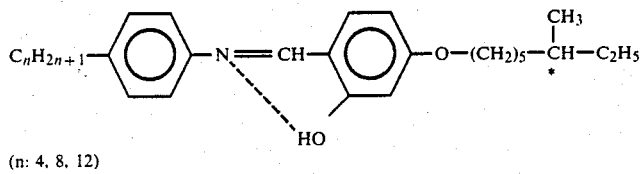

(n: 4, 8, 12)

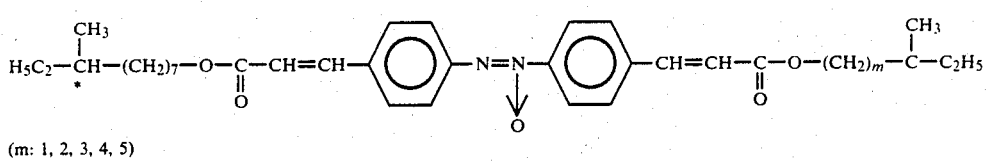

(m: 1, 2, 3, 4, 5)

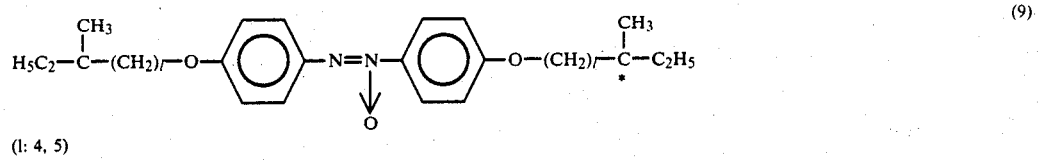

(l: 4, 5)

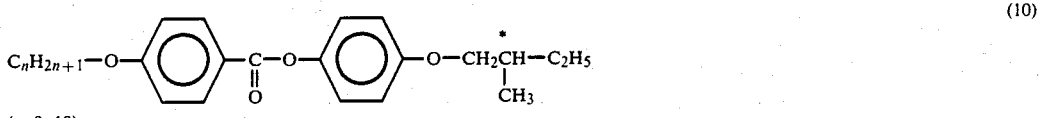

(n: 9, 10)

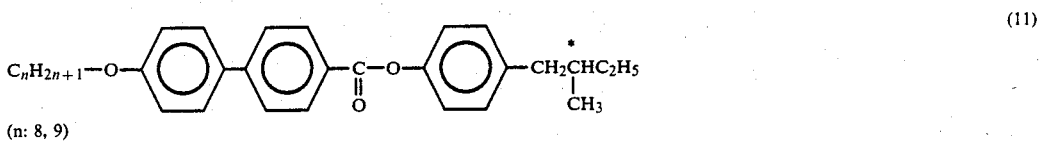

(n: 8, 9)

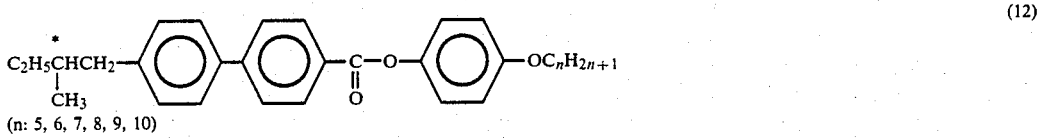

(n: 5, 6, 7, 8, 9, 10)

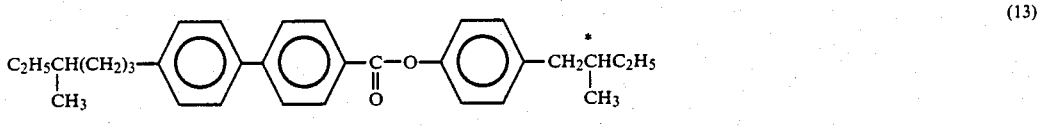

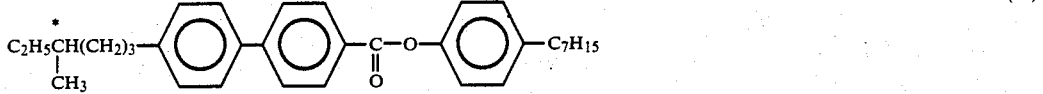

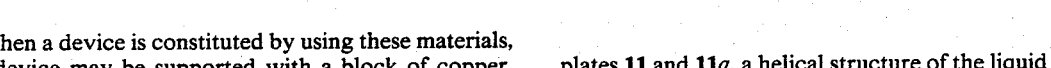

When a device is constituted by using these materials, the device may be supported with a block of copper, etc., in which a heater is embedded in order to realize a temperature condition where the liquid crystal compounds assume a desired chiral smectic phase such as SmC*- or SmH*-phase.

Figure 1:
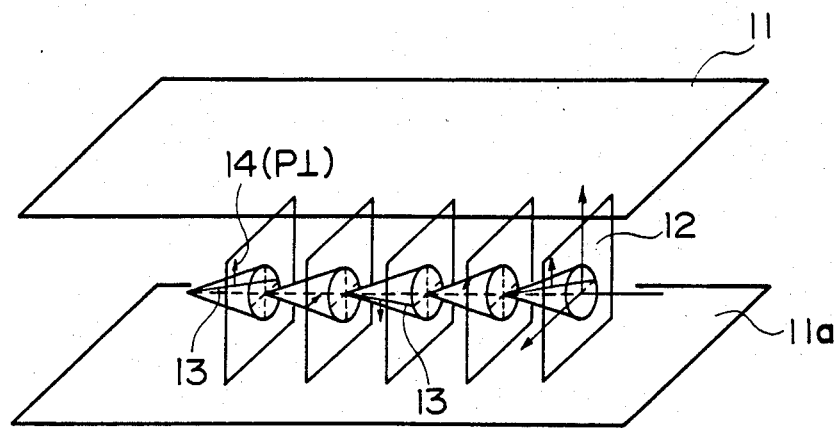
FIGS. 1 and 2 are schematic perspective views illustrating the basic operation principle of the liquid crystal device for time division driving according to the present invention.
Figure 2:
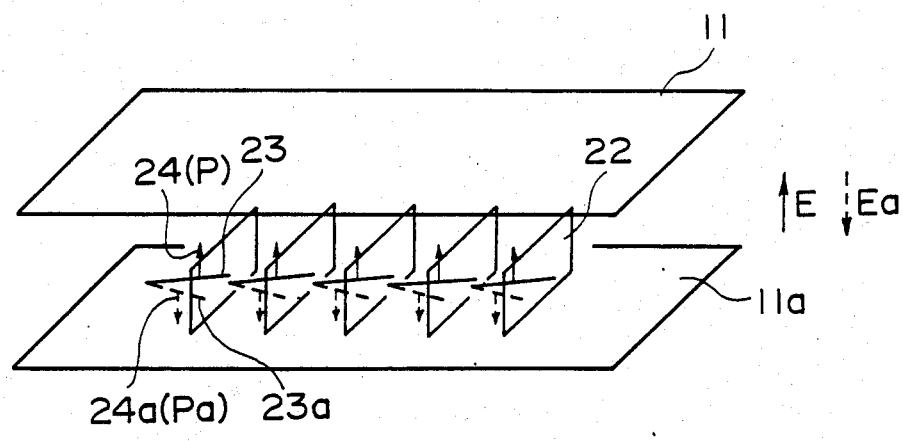

Referring to FIG. 1, there is schematically shown an example of a ferroelectric liquid crystal cell. Reference numerals 11 and 11a denote base plates (glass plates) on which a transparent electrode of, e.g., In$_2$O$_3$, SnO$_2$, ITO (Indium-Tin Oxide), etc., is disposed, respectively. A liquid crystal of an SmC*-phase in which liquid crystal molecular layers 12 are oriented perpendicular to surfaces of the glass plates is hermetically disposed therebetween. A full line 13 shows liquid crystal molecules. Each liquid crystal molecule 13 has a dipole moment (P$\perp$) 14 in a direction perpendicular to the axis thereof when a voltage higher than a certain threshold level is applied between electrodes formed on the base plates 11 and 11a, a helical structure of the liquid crystal molecule 13 is loosened to change the alignment direction of respective liquid crystal molecules 13 so that the dipole moments (P$\perp$) 14 are all directed in the direction of the electric field. The liquid crystal molecules 13 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage. Further, when the thickness of the liquid crystal cell is sufficiently thin (e.g., 1$\mu$), the helical structure of the liquid crystal molecules is loosened without application of an electric field whereby the dipole moment assume either of the two states, i.e., P in an upper direction 24 or Pa in a lower direction 24a, thus providing a bistability condition, as shown in FIG. 2. When an electric field E or Ea higher than a certain threshold level and different from each other in polarity as shown in FIG. 2 is applied to a cell having the above-mentioned characteristics, the dipole moment is directed either in the upper direction 24 or in the lower direction 24a depending on the vector of the electric field E or Ea. In correspondence with this, the liquid crystal molecules are oriented to either a first stable state 23 or a second stable state 23a.

When the above-mentioned ferroelectric liquid crystal is used as an optical modulation element, it is possible to obtain two advantages. First is that the response speed is quite fast. Second is that the orientation of the liquid crystal shows bistability The second advantage will be further explained, e.g., with reference to FIG. 2. When the electric field E is applied to the liquid crystal molecules, they are oriented in the first stable state 23. This state is stably retained even if the electric field is removed. On the other hand, when the electric field Ea of which direction is opposite to that of the electric field E is applied thereto, the liquid crystal molecules are oriented to the second stable state 23a, whereby the directions of molecules are changed. Likewise, the latter state is stably retained even if the electric field is removed. Further, as long as the magnitude of the electric field E being applied is not above a certain threshold value, the liquid crystal molecules are placed in the respective orientation states. In order to effectively realize high response speed and bistability, it is preferable that the thickness of the cell is as thin as possible and generally 0.5 to 20μ, particularly 2μ or less. A liquid crystal electrooptical device having a matrix electrode structure in which the ferroelectric liquid crystal of this kind is used is proposed, e.g., in the specification of U.S. Pat. No. 4,367,924 by Clark and Lagerwall.

Next, an embodiment of method for driving a ferroelectric liquid crystal will be described with reference to FIGS. 3 to 5.

Figure 3:
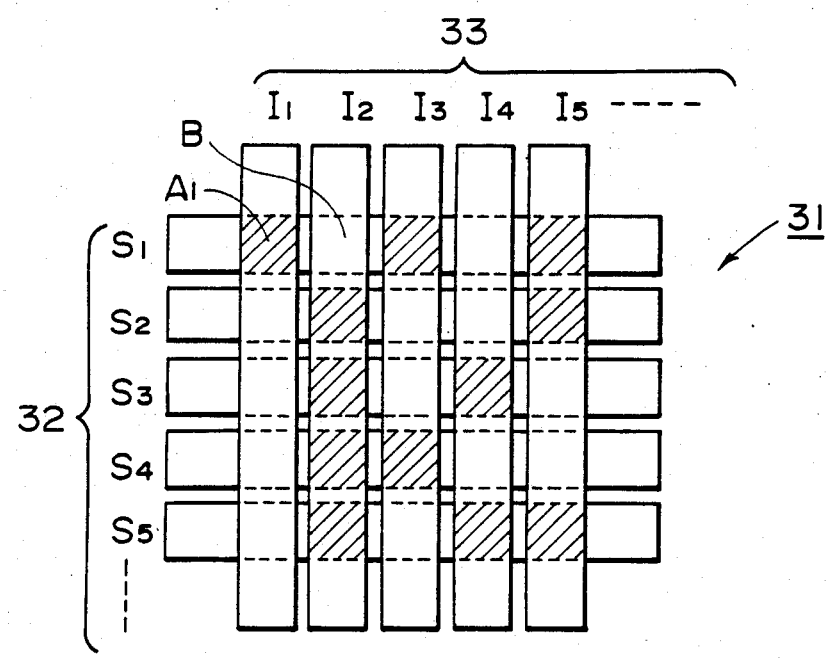
FIG. 3 is a plan view of a matrix electrode structure and picture elements formed at intersections of electrodes.
Figure 4C:
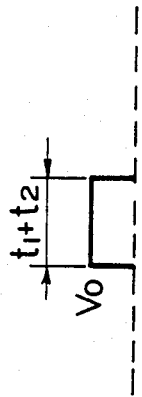
FIGS. 4A to 4D illustrate electric signals applied to the matrix electrodes.
Figure 4D:
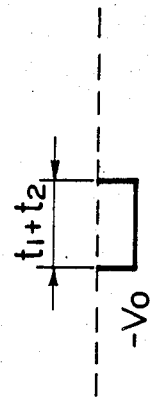
Figure 4A:
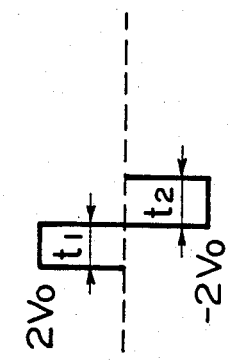
Figure 4B:
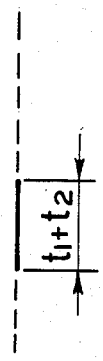

Referring to FIG. 3, there is schematically shown an example of a cell 31 having a matrix electrode arrangement in which a ferroelectric liquid crystal compound (not shown) is interposed between a pair of groups of electrodes oppositely spaced from each other. Reference numerals 32 and 33 denote a group of scanning electrodes and a group of signal electrodes, respectively. First, an instance of a scanning electrode $S_1$ being selected is explained. Referring to FIGS. 4A and 4B, there are respectively shown electric signals applied to a selected scanning electrode $S_1$ and electric signals applied to the other scanning electrodes (non-selected scanning electrodes) $S_2$, $S_3$, $S_4$. On the other hand, FIGS. 4C and 4D show electric signals applied to the selected signal electrode $I_1$, $I_3$, $I_5$ and electric signals applied to the non-selected signal electrodes $I_2$, $I_4$, respectively. In FIGS. 4A to 4D and 5A to 5D, the abscissa and the ordinate represent a time and a voltage, respectively. For instance, when displaying a motion picture, the group of scanning electrodes 32 are sequentially and periodically selected. If a threshold voltage for giving a first stable state of the liquid crystal having bistability is referred to as $V_{th1}$ and a threshold voltage for giving a second stable state thereof as $-V_{th2}$, respectively, at a specific voltage application time $t_1$ or $t_2$, an electric signal applied to the select scanning electrode 42($S_1$) is an alternating voltage showing $2V_0$ at a phase (time) $t_1$ and $-2V_0$ at a phase (time) $t_2$, as shown in FIG. 4A. When such an electric signal having plural phases of mutually different voltages is applied to a selected scanning electrode, an important effect can be obtained that switching between the first and second stable states corresponding to optically "bright" and "dark" states, respectively, can be quickly caused.

On the other hand, the other scanning electrodes $S_2$–$S_5$ . . . are grounded as shown in FIG. 4B. Accordingly, the electric signals appearing thereon show zero volt. Further, an electric signal applied to the selected signal electrodes $I_1$, $I_3$, $I_5$ shows V as indicated in FIG. 4C while an electric signal applied to the non-selected signal electrodes $I_2$, $I_4$ shows $-V$ as indicated in FIG. 7D. In this instance, the voltage V is set to a desired value which satisfies $V_0 < V_{th2} < 3V_0$ and $-3V_0 < -V_{th1} < -V_0$. Voltage waveforms applied to each picture elements A and B, for example, among the picture elements shown in FIG. 3, when such electric signals are given are shown in FIGS. 5A and 5B, respectively. Namely, as seen from FIG. 5A, a first signal voltage of $3V_0$ above the threshold level $V_{th2}$ is applied to the ferroelectric liquid crystal at the picture elements A on the selected scanning line at a phase $t_2$. Further, a second signal voltage of $-3V_0$ exceeding the threshold level $-V_{th1}$ is applied to the ferroelectric. liquid crystal at the picture elements B on the same scanning line at a phase $t_1$. Accordingly, depending upon whether a signal electrode is selected or not on a selected scanning electrode line, the orientation of liquid crystal molecules changes. Thus, when a certain signal electrode is selected, the liquid crystal molecules are oriented to the first stable state while when not selected, oriented to the second stable state. In either case, the orientation of the liquid crystal molecules is not related to the previous states of each picture element.

On the other hand, as shown in FIGS. 5C and 5D, a voltage applied to all the picture elements on the non-selected scanning lines is $+V_0$ or $-V_0$, each not exceeding the threshold level. Accordingly, the ferroelectric liquid crystal molecules electrically connected to the respective picture elements on the non-selected scanning lines are placed in the orientations corresponding to signal states produced when they have been last scanned without change in orientation. Namely, when a certain scanning electrode is selected, signals corresponding to one line are written and thus writing of signals corresponding to one frame is completed. The signal state of each picture element can be maintained until the line is subsequently selected. Accordingly, even if the number of scanning lines increases, the duty ratio does not substantially change, resulting in no possibility of lowering in contrast, occurrence of crosstalk, etc.

Figure 9:
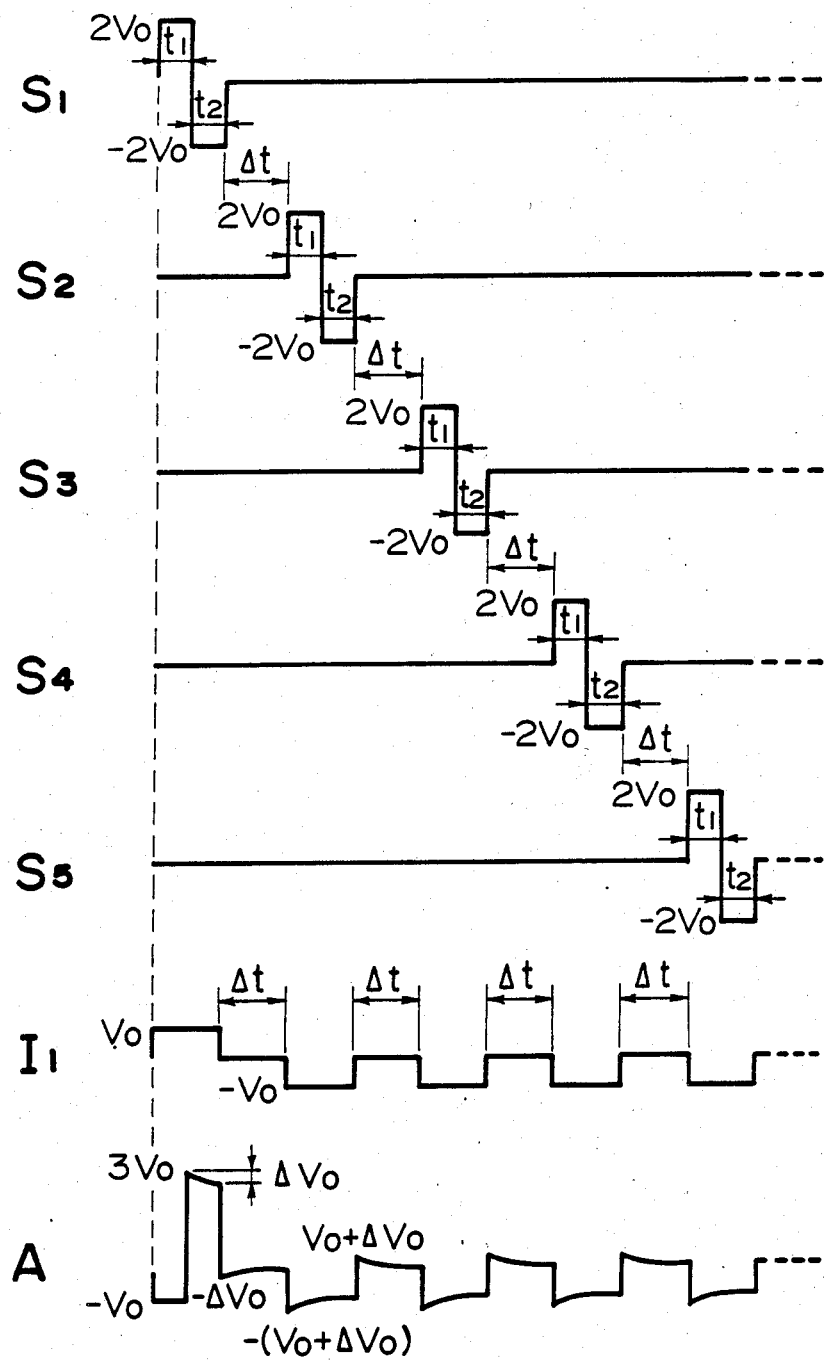
FIG. 9 illustrates another embodiment of a time chart showing signals applied to the liquid crystal device according to the present invention.

Referring to FIG. 3, it is assumed that, among the picture elements formed at intersections of the scanning electrodes $S_1$–$S_5$ . . . and the signal electrodes $I_1$–$I_5$, the picture elements with hatching are in the "bright" state and picture elements drawn in white are in the "dark" state. When display states on a signal electrode $I_1$ in FIG. 9 are noted, a picture element (A) on a scanning electrode $S_1$ is in the "bright" state, and the other picture elements (B) are all in the dark state.

By the way, with respect to a ferroelectric liquid crystal device placed under bistability condition as described above, the liquid crystal layer is formed in an extremely thin layer as thin as 2 μm or less and accordingly a short circuit can be caused between the opposite electrodes through fine particles disposed in the device. In order to obviate the short circuit, there is generally formed an insulating layer covering either one or both of the opposite electrodes, respectively.

However, because of the insulating layer(s) formed on the opposite electrodes, when a writing pulse as shown in FIG. 5B, which is expected to be sufficiently large to cause complete reversal of the ferroelectric liquid crystal, is applied to, e.g., a picture element B between the electrodes, a voltage having a waveform as shown in FIG. 6 is actually applied to the liquid crystal layer. Thus, the actual voltage decreases in absolute value from $-3V_0$ by $\Delta V_0$ in a proportion of $\pi = R_1(C_1 + C_2)$ (wherein $R_1$: resistivity of the liquid crystal layer, $C_1$ capacitance of a unit area of the liquid crystal layer, $C_2$ capacitance of a unit area of the dielectric layer), and the decreased voltage $\Delta V_0$ is added to $V_0$ which is expected to be applied at the time of switching of pulses, i.e., at the beginning of phase $t_2$. This additional voltage can cause reversal of display state from that obtained by writing in phase $t_1$ (first display state based on first orientation state of the ferroelectric liquid crystal) to the reverse display state (second display state based on second orientation state of the ferroelectric liquid crystal. The above fact has been clarified by our experiments. More specifically, in a line-by-line writing scheme as explained with reference to the FIGS. 4A to 5D, a display state obtained in phase $t_1$ is required to be retained without reversal in phase $t_2$. Thus, a voltage exceeding a reversal or switching threshold voltage must not be applied in phase $t_2$. According to out study, however, it has been clarified that a voltage $V_0 + \Delta V_0$ exceeding the switching threshold voltage is applied in phase $t_2$ at the time of switching pulse polarities from phase $t_1$ to phase $t_2$ and a picture element expected to retain the first display state is reversed to the second display state, whereby a desired display cannot be attained. It has been also clarified that this phenomenon is caused by a reverse electric field $(+\Delta V_0)$ generated by discharge from the capacitor of the dielectric layer connected in series to the liquid crystal layer at the time of switching pulse polarities.

On the other hand, it has also been recognized that a picture element which has been written in the first or second display state in phases $t_1$ and $t_2$ can reverse the display state even in a non-scanning time period because information signals are continually applied from data lines. In order to obviate this problem, a method of applying alternating voltages not exceeding threshold values to the picture elements after writing has been conceived. A mode of operation according to this method is illustrated in FIG. 9 wherein a writing signal and auxiliary signals of alternating voltages for preventing reversal phenomena, which are applied to a picture element A, are shown in time series by way of waveforms. However, application of such alternating voltages (e.g., AC voltages) also involves the problem as described above caused by the addition of a reverse electric field accompanying the application of reverse polarities of pulses as shown in the waveform at the bottom of FIG. 9.

Figure 7:
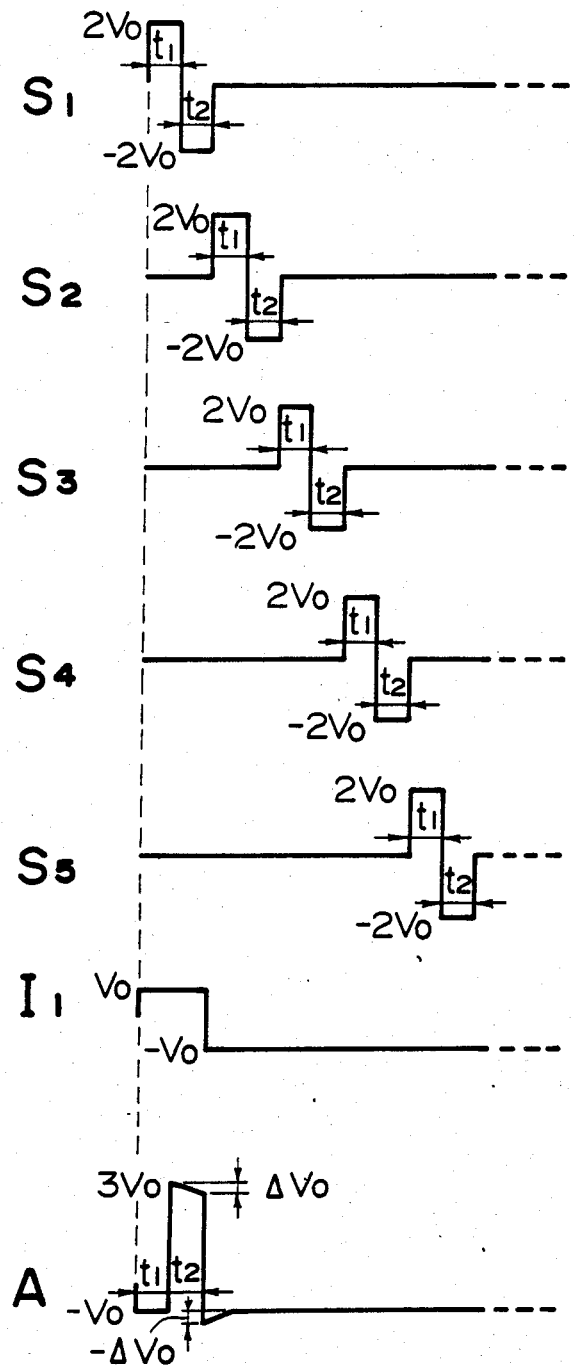
FIG. 7 illustrates a time chart showing signals applied to the liquid crystal device according to the present invention.

Further, FIG. 7 shows time-serially applied waveforms by using unit pulse signal as shown in FIGS. 4A to 4D. Referring to FIG. 7, according to an ideal operation, a voltage of $3V_0$ exceeding the threshold voltage $V_{th2}$ is applied to a picture element A, whereby the picture element A is oriented or switched to one stable state, e.g., "bright" state, regardless of the previous history thereof. Thereafter, while the other scanning lines $S_2$-$S_5$ . . . are scanned, a voltage of $-V_0$ not exceeding the switching threshold voltage $-V_{th1}$ is applied so that the picture element A retains "bright" state. In actual operations, however, when one direction of signal (one for providing "dark" state in this case) is continually applied to one signal electrode in this manner, a problem can occur especially in a case where a very large number of scanning lines are used and a high speed driving is pursued. This is explained based on some experimental data.

Figure 8:
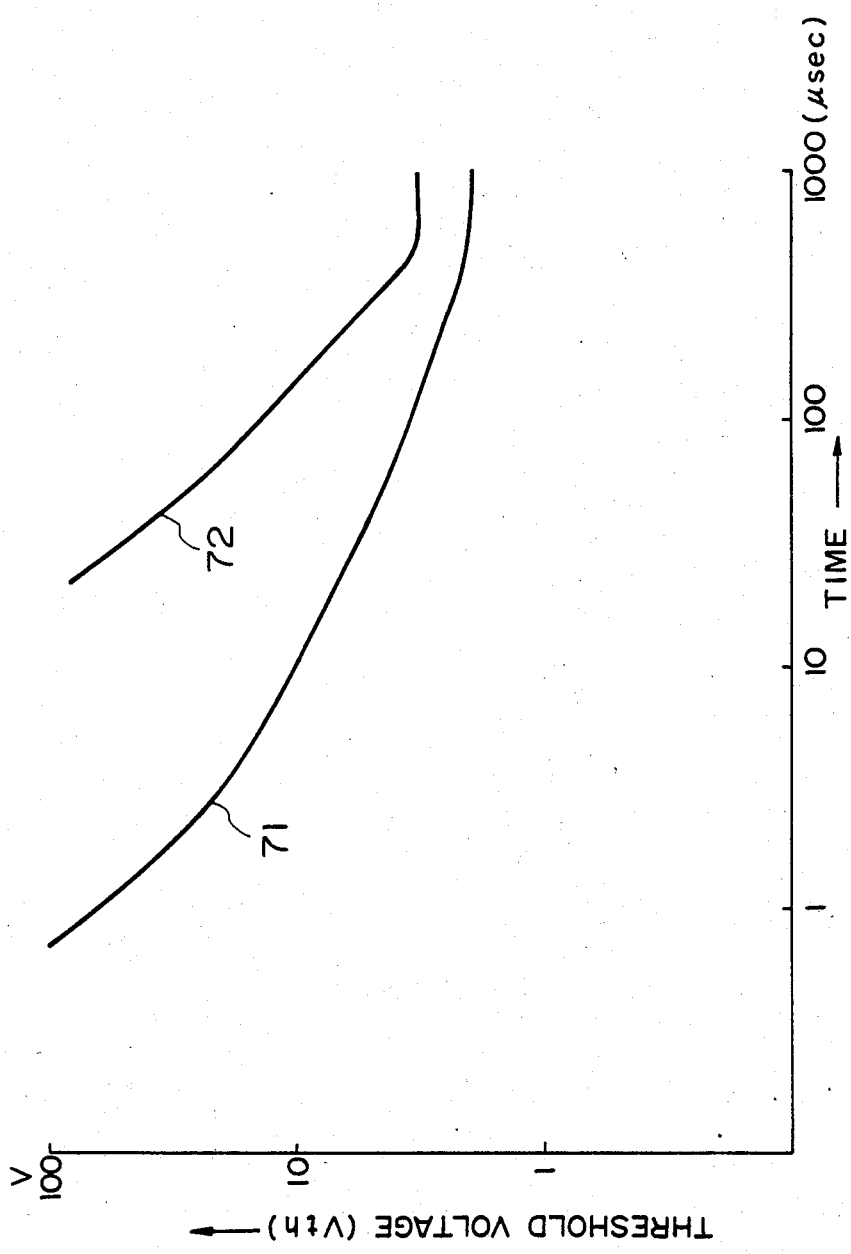
FIG. 8 is graph showing how a threshold voltage of a ferroelectric liquid crystal depends upon a voltage-application time.

FIG. 8 is a graph plotting an application-time dependency of a threshold voltage required for switching when DOBAMBC (designated by reference numeral 82 in FIG. 8) and HOBACPC (designated by reference numeral 81 in FIG. 8) were used as ferroelectric liquid crystal materials. In both cases, the thickness of the liquid crystal was $1.6\mu$, and the temperature was controlled at 70° C. In this experiment, as base plates between which a liquid crystal was hermetically interposed, e.g., glass plates on which ITO was vapor-deposited were used, and the threshold voltages $V_{th1}$ and $T_{th2}$ were nearly equal to each other, i.e., $V_{th1} \approx V_{th2} (\equiv V_{th})$.

As seen from FIG. 8, it is understood that the threshold voltage $V_{th}$ has a dependency on the application time and becomes steeper as an application time becomes shorter. As will be understood from the above-mentioned consideration, some problem occurs when a driving method as practised in FIG. 7 is employed, and when this driving method is applied to a device which has an extremely large number of scanning lines and is required to be driven at a high speed. Namely, for instance, even if the picture element A is switched to "bright" state at a time when the scanning electrode $S_1$ is scanned, a voltage of $-V$ is always and continuously applied after the concerned scanning is finished, whereby it is possible that the picture element is switched to the "dark" state before the scanning of one picture is completed.

Particularly, where an insulating layer is formed on an electrode, the effective voltage decreases with the lapse of time since the time of pulse application, the thus decreased voltage is added as a reverse polarity of voltage at the time of switching pulses This phenomenon is illustrated at the bottom of FIG. 7. Thus, in view of the waveform A in FIG. 7, at voltage of $3V_0$ is not applied in phase $t_2$ but a voltage decrease of $\Delta V_0$ gradually occurs. When this writing signal is ceased to be applied, an additional voltage of $-V_0$ is applied whereby the above mentioned reversal phenomenon is accelerated.

As a result of our further study, based on the above observation, especially on the bistable liquid crystal constituting a liquid crystal device, it has been found possible to prevent the above mentioned reversal phenomenon and retain a once-written signal state until the subsequent writing cycle when the volume resistivity of the ferroelectric liquid crystal is adjusted to $1 \times 10^9$ $\Omega$.cm or above, more specifically to a range of $1 \times 10^9$ $\Omega$.cm to $1 \times 10^{13}$ $\Omega$.cm, preferably $1 \times 10^{10}$ $\Omega$.cm to $1 \times 10^{13}$ $\Omega$.cm and particularly preferably to a range of $1 \times 10^{11}$ $\Omega$.cm to $1 \times 10^{13}$ $\Omega$.cm.

On the other hand, if the volume resistivity of the ferroelectric liquid crystal is below $1 \times 10^9$ $\Omega$.cm, the voltage decrease $\Delta V_0$ amounts to approximately $3V_0/3$, whereby a reversal of display occurs during one frame period of writing operation as will be described in the examples appearing hereinafter.

In order to obtain a ferroelectric liquid crystal having a volume resistivity of $1 \times 10^9$ Ω.cm or above, it is conveniently adopted, for example, to add an adsorbent for ionic substances such as alumina particles, silica gel particles, etc. into a ferroelectric liquid crystal, vigorously stir the resultant mixture and separate the ionic adsorbent by filtration. The ionic adsorbent may preferably be in the form of particles having an average particle size of the order of 10 to 50 μm.

The "volume resistivity" of a ferroelectric liquid crystal material described herein has been obtained through the dual frequency method by using a circuit as shown in FIG. 10 to apply rectangular pulses and using the following equations to calculate ρ (volume resistivity).

$$I = I_C + I_R = 4f.C.V + V/R,$$ wherein V: measured voltage, f: frequency of the rectangular pulses. $I_C$: current of capacive component, $I_R$: current of R component. C: capacitor of liquid crystal, and R: resistivity of liquid crystal (Ω).

For different frequencies, the following equations are used:

$$I_1 = 4f_1.C.V + V/R.$$

$$I_2 = 4f_2.C.V + V/R.$$

Finally, ρ is calculated by the following equation:

$$P = PS/d$$

wherein d: thickness of liquid crystal layer (cell gap), and S: electrode area.

The insulating material constituting the above mentioned insulating layer used in the present invention are not particularly limited but may be appropriately selected from inorganic insulating materials such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide and magnesium fluoride; or organic insulating materials such as polyvinyl alcohol, polyimide, polyamide-imide, polyester-imide, polyparaxylylene, polyester, polycarbonate, polyvinylacetal, polyvinyl chloride, polyvinyl acetate, polyamide, polystyrene, cellulose resin, melamine resin, urea resin, acrylic resin and photoresist resins. The insulating film may suitably be formed in a thickness of 5000 Å or less, preferably 100 to 5000 Å, particularly preferably 500 to 3000 Å.

The above mentioned reversal phenomenon may be prevented further more effectively by adjusting the capacitor of the insulating layer to $5.5 \times 10^3$ pF/cm² or above. The insulating layer preferably has a capacitor of $5.5 \times 10^3$-$3.0 \times 10^5$ pF/cm², particularly preferably $9.0 \times 10^3$-$5.5 \times 10^4$ pF/cm² in order to provide sufficient insulating property.

The present invention will be explained in further detail by way of actual examples of production.

EXAMPLE 1

On two electrode plates with stripe-form electrodes designed to cross each other to form opposite matrix electrodes, a 5 wt. % solution of a polyamic acid resin (combined product of pyromellitic anhydride and 4,4''-diaminodiphenyl ether) in N-methylpyrrolidone was applied and heated to 250° C. to cause ring-closure reaction to form a 1000 Å-thick polyimide film. The polyimide films on the two electrodes were respectively rubbed in one direction, and the electrode plates were fixed to each other so that their rubbed directions were in parallel with each other to form a cell.

Then, 0.3 wt. part of alumina particles having an average particle size of 30μ was added to 1 wt. part of DOBAMBC (decyloxybenzylidene-p'-amino-2-methylbutyl cinnamate) prepared in Canon Kabushiki Kaisha., and the mixture was mechanically stirred for 2 hours at a temperature providing the isotropic phase of DOBAMBC. After the mechanical stirring, DOBAMBC was separated by filtration and injected by the vacuum injection method and sealed up in the above prepared cell while being in the isotropic phase. Then, the cell was gradually cooled at a rate of 5° C./hour to form a liquid crystal cell of SmC*. A voltage of 10 V was applied to the liquid crystal cell at frequencies of 32 Hz and 64 Hz, respectively, to measure the electric current values, from which the volume resistivity of the liquid crystal was calculated at $3.7 \times 10^9$ Ω.cm.

A polarizer and ananalyzer were disposed on both sides of the liquid crystal cell in a cross nicol relationship, and signals having waveforms as shown in FIGS. 4 and 5 wer applied to the opposite matrix electrodes. The scanning signal was an alternating waveform of $+8$ volts and $-8$ volts as shown in FIG. 4A, the writing signals were $+4$ volts and $-4$ volts, respectively, and the one-frame period was 30 m.sec.

As a result of the memory-drive type time-division driving operation as described hereinbefore under these conditions, this liquid crystal device provided a normal motion picture display without causing reversal of written states.

COMPARATIVE EXAMPLE 1

On the other hand, as a comparative test, a liquid crystal device was prepared in the same manner as in the above except that the mechanical stirring of DOBAMBC in the presence of alumina particles was omitted. The volume resistivity of the liquid crystal in this device was measured in the same manner and formed to be $1.2 \times 10^8$ Ω.cm. When this liquid crystal device was driven in the same manner as described above, a once-written display state was reversed during one-frame operation whereby normal motion picture was not displayed.

Example 2

A liquid crystal device was prepared in the same manner as in Example 1 except that the DOBAMBC used in Example 1 was replaced by HOBACPC (hexyloxybenzylidene-p'-amino-2-chloropropyl cinnamate) prepared in Canon K.K.

The volume resistivity of the liquid crystal cell was measured to be $1.6 \times 10^{10}$ Ω.cm. After disposing a polarizer and an analyzer on the liquid crystal cell, the resultant liquid crystal was subjected to a time-division driving as described above, whereby good motion picture was displayed likewise.

Comparative Example 2

A liquid crystal device was prepared in the same manner as in the above Example 2 except that the mechanical stirring of HOBACPC in the presence of alumina particles was omitted. The volume resistivity of the liquid crystal in this device was measured in the same manner and formed to be $5.2 \times 10^8$ Ω.cm. When this liquid crystal device was driven in the same manner as described above, a once-written display state was reversed during one-frame operation whereby normal motion picture was not displayed.

EXAMPLES 3-6 AND COMPARATIVE EXAMPLES 3-6

The DOBAMBC and HOBACPC were subjected to mechanical stirring for different periods of time in the presence of alumina particles or to addition of an ionic surfactant to obtain ferroelectric liquid crystals having volume resistivities as shown in the following Table 1.

Liquid crystal devices were prepared by using these ferroelectric liquid crystals and subjected to time-division driving in the same manner as in Example 1, whereby the results shown in Table 1 were obtained. The symbols used in Table 1 with respect to the display performance indicates the following. Thus, o shows that no reversal phenomenon was observed, x serious reversal phenomena observed, and Δ partial reversal phenomen observed.

TABLE 1

| Example | Ferroelectric liquid crystal | Volume resistivity | Display performance |
|---|---|---|---|
| Comparative Example | | | |
| 3 | DOBAMBC | $6.2 \times 10^7 \, \Omega \cdot cm$ [*1] | x |
| 4 | HOBACPC | $4.5 \times 10^7$ [*2] | x |
| 5 | DOBAMBC | $5.9 \times 10^8$ | Δ |
| 6 | HOBACPC | $16.8 \times 10^8$ | Δ |
| Example | | | |
| 3 | DOBAMBC | $2.6 \times 10^{10}$ | o |
| 4 | DOBAMBC | $3.2 \times 10^{10}$ | o |
| 5 | HOBACPC | $2.2 \times 10^9$ | o |

[*1], [*2]: Ionic surfactant added.

What is claimed is:

1. A liquid crystal device comprising a plurality of picture elements arranged in a plurality of rows; each picture element comprising a pair of oppositely spaced electrodes and a ferroelectric liquid crystal disposed between the electrodes and showing a first stable state and a second stable state depending on an electric field applied;
   said liquid crystal device being driven by sequentially orienting the ferroelectric liquid crystal at selected picture elements on a selected row to the first or second stable state to write in the picture elements row by row;
   said ferroelectric liquid crystal having a volume resistivity of $1 \times 10^9 \, \Omega.cm$ or larger.

2. A liquid crystal device according to claim 1, wherein said ferroelectric liquid crystal has volume resistivity of $1 \times 10^{10} \, \Omega.cm$ to $1 \times 10^{13} \, \Omega.cm$.

3. A liquid crystal device according to claim 1, wherein said ferroelectric liquid crystal has a volume resistivity of $1 \times 10^{11} \, \Omega.cm$ to $1 \times 10^{13} \, \Omega.cm$.

4. A liquid crystal device according to claim 1, wherein said ferroelectric liquid crystal has a volume resistivity of $1 \times 10^{12} \, \Omega.cm$ to $1 \times 10^{13} \Omega.cm$.

5. A liquid crystal device according to claim 1, wherein an insulating film of an inorganic insulating material is disposed on at least one of the electrodes.

6. A liquid crystal device according to claim 5, wherein said inorganic insulating material is at least one member selected from the group consisting of silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide and magnesium fluoride.

7. A liquid crystal device according to claim 1, wherein an insulating film of an organic insulating material is disposed on at least one of the electrodes.

8. A liquid crystal device according to claim 7, wherein said organic insulating material is at least one member selected from the group consisting of polyvinyl alcohol, polyimide, polyamide-imide, polyester-imide, polyparaxylylene, polyester, polycarbonate, polyvinylacetal, polyvinyl chloride, polyvinyl acetate, polyamide, polystyrene, cellulose resin, melamine resin, urea resin, acrylic resin and photoresist resins.

9. A liquid crystal device according to claim 1, wherein an insulating layer providing a capacitance of $5.5 \times 10^3 pF/cm^2$ or above is disposed on at least one of the electrodes.

10. A liquid crystal device according to claim 9, wherein said insulating layer provides a capacitance of $5.5 \times 10^3$ to $3.0 \times 10^5 \, pF/cm^2$.

11. A liquid crystal device according to claim 9, wherein said insulating layer provides a capacitance of $9.0 \times 10^3$ to $5.5 \times 10^4 \, pF/cm^2$.

12. A liquid crystal device according to claim 1, wherein said ferroelectric liquid crystal is a smectic liquid crystal.

13. A liquid crystal device according to claim 1, wherein said ferroelectric liquid crystal is a chiral smectic liquid crystal.

14. A liquid crystal device according to claim 13, wherein said chiral smectic liquid crystal is in C phase, H phase, I phase, J phase, K phase, G phase and F phase.

15. A liquid crystal device according to claim 13, wherein said chiral smectic liquid crystal is in a non-spiral structure.

16. A liquid crystal device according to claim 1, wherein an alternating voltage for preventing reversal phenomenon is applied to a picture element to which said writing signal is not being applied.

17. A liquid crystal device according to claim 16, wherein said alternating voltage is an AC voltage.

18. A driving method for a liquid crystal device comprising a plurality of picture elements arranged in a plurality of rows; each picture element comprising a ferroelectric liquid crystal showing a first stable state and a second stable state depending on an electric field applied thereto and having a volume resistivity of $1 \times 10^9 \, \Omega.cm$ or larger
   said driving method comprising: orientating the ferroelectric liquid crystal at a picture element on a selected row to the first or second stable state to write in the picture elements row by row; and
   applying a voltage signal of an alternating waveform to the ferroelectric liquid crystal at the picture element on a nonselected row.

19. A driving method according to claim 18, wherein said alternating waveform is an AC voltage.

20. A driving method according to claim 18, wherein said ferroelectric liquid crystal has a volume resistivity of $1 \times 10^{10} \, \Omega.cm$ to $1 \times 10^{13} \, \Omega.cm$.

21. A driving method according to claim 18, wherein said ferroelectric liquid crystal has a volume resistivity of $1 \times 10^{11} \, \Omega.cm$ to $1 \times 10^{13} \, \Omega.cm$.

22. A driving method according to claim 18, wherein said ferroelectric liquid crystal has a volume resistivity of $1 \times 10^{12} \, \Omega.cm$ to $1 \times 10^{13} \, \Omega.cm$.

23. A driving method according to claim 18, wherein said ferroelectric liquid crystal is placed under bistability condition.

24. A driving method for a liquid crystal device comprising a plurality of picture elements arranged two-dimensionally; each picture element comprising opposite electrodes, a layer of a ferroelectric liquid crystal having a volume resistivity of $1\times 10^9$ Ω.cm or larger and disposed between the opposite electrodes and having a first display state and a second display state;

said driving method comprising:
applying a first writing signal of a polarity for producing a first display state and a holding signal of a reverse polarity for holding the first display state respectively to a selected first group of picture elements among said plurality of picture elements, and applying a second writing signal for producing a second display state respectively to a remaining second group of picture elements.

25. A driving method according to claim 24, wherein an alternating voltage for preventing reversal of display states is applied to a picture element to which said writing signals are not being applied.

26. A driving method according to claim 25, wherein said alternating voltage is an AC voltage.

27. A driving method according to claim 24, wherein said ferroelectric liquid crystal has a volume resistivity of $1\times 10^{10}$ Ω.cm to $1\times 10^{13}$ Ω.cm.

28. A driving method according to claim 24, wherein said ferroelectric liquid crystal has a volume resistivity of $1\times 10^{11}$ Ω.cm to $1\times 10^{13}$ Ω.cm.

29. A driving method according to claim 24, wherein said ferroelectric liquid crystal has a volume resistivity of $1\times 10^{12}$ Ω.cm to $1\times 10^{13}$ Ω.cm.

30. A driving method according to claim 24, wherein said ferroelectric liquid crystal state is placed under bistability condition.

31. A driving method according to claim 18, wherein the orienting of the ferroelectric crystal comprises a first phase of applying a voltage signal for orienting the ferroelectric liquid crystal to the first stable state and a second phase of applying a voltage signal for orienting the ferroelectric liquid crystal to the second stable state; the voltage signals applied in the first and second phases having mutually opposite polarities.

* * * * *

UNITED STATES PATENT AND TRADEMARK OFFICE
CERTIFICATE OF CORRECTION

PATENT NO. : 4,681,404            Page 1 of 2

DATED : July 21, 1987

INVENTOR(S) : SHINJIRO OKADA, ET.AL.

It is certified that error appears in the above-identified patent and that said Letters Patent is hereby corrected as shown below:

COLUMN 3

Lines 8-9,     "electodes" should read --electrodes--.

COLUMN 4

Line 26,     "formulas" should read --formulas: (In the formulas, C accompanied with * is an asymmetric carbon atom.)

COLUMN 5

Line 67,     "thereof when" should read --thereof. When--.

COLUMN 7

Line 1,     "assume" should read --assumes--.
Line 56,     "electrode" should read --electrodes--.

COLUMN 8

Line 15,     "7D." should read --4D.--.

COLUMN 9

Line 32,     "out" should read --our--.

COLUMN 10

Line 22,     "$T_{th2}$" should read --$V_{th2}$--.

Line 65,     "$3V0/3$," should read --$3V_0/3$,--.

UNITED STATES PATENT AND TRADEMARK OFFICE
CERTIFICATE OF CORRECTION

PATENT NO. : 4,681,404

DATED : July 21, 1987

INVENTOR(S) : SHINJIRO OKADA, ET.AL.

Page 2 of 2

It is certified that error appears in the above-identified patent and that said Letters Patent is hereby corrected as shown below:

COLUMN 11

Line 33, "material" should read --materials--.

COLUMN 12

Line 20, "ananalyzer" should read --an analyzer--.
Line 23, "wer" should read --were--.

Signed and Sealed this

Twelfth Day of January, 1988

Attest:

DONALD J. QUIGG

Attesting Officer

Commissioner of Patents and Trademarks